April 25, 1950 V. J. DUKE 2,505,732

SIGNAL TRANSLATING SYSTEM

Filed July 31, 1948

Inventor

Vernon J. Duke

By

[signature]

Attorney

Patented Apr. 25, 1950

2,505,732

UNITED STATES PATENT OFFICE 2,505,732

SIGNAL TRANSLATING SYSTEM

Vernon J. Duke, Rockville Center, N. Y., assignor to Radio Corporation of America, a corporation of Delaware Application July 31, 1948, Serial No. 41,862

6 Claims. (Cl. 315—27)

The present invention relates to electrical circuits designed to translate combination signals comprising a variable direct current control component and an alternating current signal component and more particularly relates to the transmission of deflection signals for a cathode ray beam generated in a cathode ray tube concomitantly with the transmission of cathode ray beam positioning potentials over a low impedance transmission line of a type suitable for communicating electrical signals with minimum loss.

In the communications art it is commonly necessary to transmit electrical signals having direct current components over considerable distances with the desire of suffering as little attenuation of the alternating current component as possible and of maintaining the direct current component as accurately as possible. Most communications equipment productive of electrical signals employ impedance changing devices to step down the output impedance of an amplifier or the like to an impedance value suitable for proper termination of a coaxial line or other conventional form of transmission line. At the receiving end of such a line there is usually provided means for transforming the low impedance of the transmission line to a higher impedance which is more suitable for matching the input impedance of the receiving end terminal equipment. In the impedance changing functions from output terminal equipment to line and from line to utilization means, electromagnetic transformers are perhaps the most widely used devices and accordingly in their use direct current components of the signal to be transmitted are sacrificed unless more elaborate instrumentalities are employed.

Particularly in television art is there found need for communicating over low impedance transmission lines combination unidirectional current and alternating current signals with the desire of employing a bare minimum of equipment in utilizing the signals at the receiving end. For instance, the sweep deflection signals for kinescope or camera tubes may be some times more conveniently generated at a point remote from such tubes. Under such conditions it is often desirable in the case of camera tubes to effect beam positioning of the electronic beam within the camera tube from a remote control position and thus relieve the television camera operator of this added responsibility. In order to achieve beam positioning from a remote location, it is more economical to communicate such beam positioning data over the same coaxial line employed to handle the deflection signals and since a minimum of equipment is desirable at the television camera, energization of the deflection coils for the camera tube is frequently accomplished by simply connecting the deflectum coil through a suitable impedance transformer to the coaxial transmission line.

Obviously, any attempt to place a beam positioning potential across a coaxial transmission line which is conventionally terminated by transformer would, on the face of it, be unsatisfactory since the low direct current resistance of the transformer winding would likely present an intolerably heavy load upon the source of positioning potential notwithstanding the fact that with conventional connections no opportunity is provided for a direct current signal component to pass from primary to secondary of a transformer. Furthermore, an appreciable amount of direct current in the primary of the matching transformer might saturate the transformer or otherwise interfere with the transmission of the deflection potentials.

The present invention obviates such difficulties and still the use of somewhat conventional transformers in making necessary impedance transformations from coaxial line to terminal equipment. The desired results are accomplished through the use of a properly located direct current blocking capacitor which prevents direct current from flowing in the transformer windings directly connected to the transmission line hence permitting direct current effects to be conveniently transmitted via a coaxial or low impedance line to terminal equipment regardless of impedances changing transformers that may be cascaded therewith.

It is therefore a purpose of the present invention to provide a simple and economical method of communicating direct current control potentials through transmission lines having cascaded therein electromagnetic impedance changing devices.

It is a further object of the present invention to provide a novel method of transmitting sweep circuit deflection signals to cathode ray devices from remote points and to incorporate via the same transmission medium, unidirectional control potentials suitable for beam positioning purposes.

It is further an object of the present invention to provide a circuit arrangement involving an electromagnetic transformer which effectively permits the use of said transformer to simultaneously perform its normal functions from an alternating current standpoint while effectively passing unidirectional currents from its input circuit to its output circuit.

The novel features which are believed to be characteristic of the present invention are set forth in the appended claims. The invention itself, however, as to both its organization and method of operation will be best understood with reference to the following description especially when considered in connection with the accompanying drawings wherein:

Figure 1:
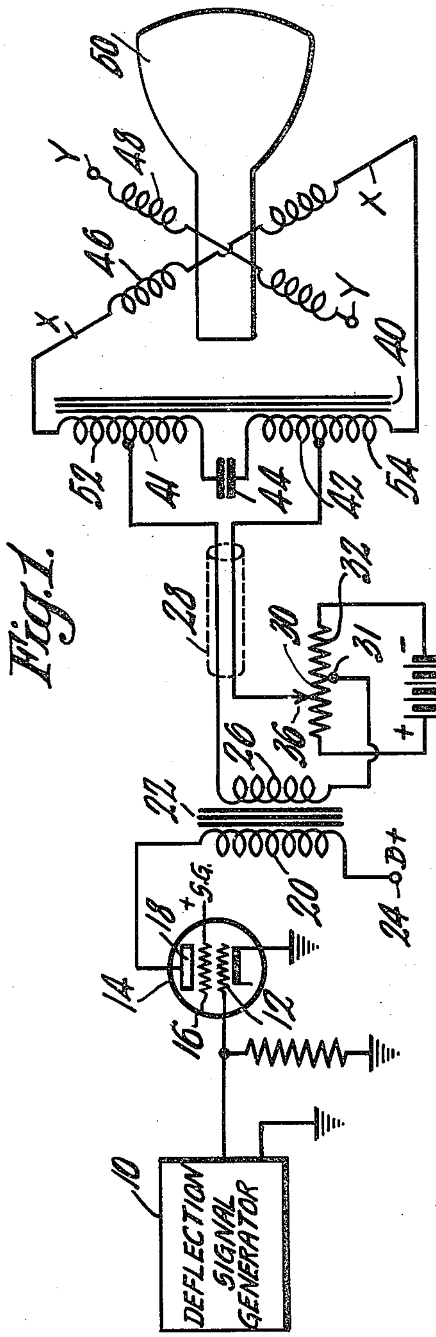
Figure 1 shows application of the present invention to one form of cathode ray tube deflection circuit.

Referring now to Figure 1 there is shown a deflection circuit signal generator 10 which produces a wave form suitable for application to an electromagnetic cathode ray tube deflection yoke. The signal from the generator 10 is applied to the grid 12 of output tube 14, the screen grid 16 being supplied with a suitable positive potential indicated by $+s.g.$ According to conventional methods the plate 18 is connected with one end of the primary 20 of the output transformer 22 the other end of the primary winding being connected with a source 24 of positive plate potential. The secondary winding 26 of the transformer 22 provides a low impedance source of deflection signal for properly matching the coaxial line 28 shown balanced to ground and which in practice may have a surge impedance of several hundred ohms or less. It is seen that a portion 30 of resistor 32 is included in series with the secondary winding in its connection to the coaxial line. Accordingly across the extremities of the resistor 32 there is in turn placed a source of potential such as 34 which provides a potential gradient along the resistor 32 which may be sampled by adjustable contact 36 and thereby determine the polarity and magnitude of potential which will be introduced in series with the output of secondary winding 26.

The receiving end of the system comprises a balanced auto-transformer 40 having a split primary comprising sections 41 and 42, one extremity of each winding being connected to the D. C. blocking capacitor 44 while the other extremities are connected to the coaxial line 28. Electromagnetic deflection coils 46 and 48 are shown associated with the cathode ray type tube 50 for producing beam deflection along the X and Y axes respectively. As shown the X axis deflection coil 46 is connected to the two windings 52 and 54 of the auto-transformer secondary.

In this arrangement it is evident that by suitably proportioning the secondary windings 52 and 54 of the auto-transformer 40 an appropriate output impedance may be obtained for more efficiently driving the deflection coil 46, inasmuch as the impedance of such a yoke would normally be considerably in excess of that of a practical transmission line. According to the present invention a direct current may be passed through the coil 46 for purposes of beam positioning by merely adjusting the tap 36 on resistor 32. By way of example, as tap 36 is moved to a more positive extremity of the resistor 32 the portion 30 of resistor becomes larger and thus increases the unidirectional potential placed in series with the output transformer secondary 26 in its connection to the transmission line 28. The novel connection of the blocking capacitor 44 prevents the resulting D. C. potential across the transmission line from producing a current flow in the sections of the primary 41 and 42 but does allow a beam positioning current to flow through the sections 52 and 54 of the transformer to properly energize the yoke 46. Accordingly should a reverse in beam positioning current be required it would be only necessary to introduce an opposite voltage polarity in series with the secondary 26 by moving the tap 36 to the negative side of fixed tap 31 on resistor 32.

Figure 2:
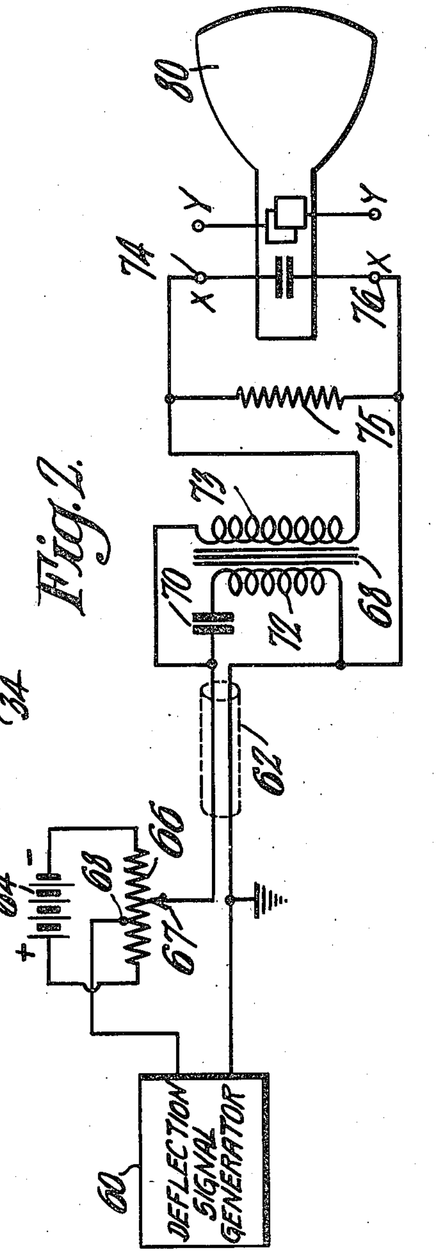
Figure 2 shows application of the present invention to another form of cathode ray deflection circuit.

Whereas in Figure 1 an electromagnetic deflection system is illustrated in connection with a balanced transmission line, in Figure 2, the present invention is shown applied to an unbalanced electrostatic system. Here a suitable deflection signal is provided by the deflection signal generator 60 which it shall be presumed, for sake of simplicity, is provided with an output impedance appropriate for direct connection of the transmission line 62. Again, a beam positioning power supply 64 is shown connected across a tapped resistor 66, a section 68 of which being shown in series with the connection of the output of the deflection signal generator to the input of the transmission line 62. Since an unbalanced system is involved a more simple form of auto-transformer may be employed or a more common form of conventional transformer such as 68 may be connected as shown to properly terminate the transmission line 62 and provide a voltage step up of the deflection signal for application to the deflection terminals 74 and 76 of the cathode ray tube 80. Again according to the present invention, blocking condenser 70 prevents the unidirectional potential developed across section 68 of resistor 66 from producing a current flow in the primary 72 of the transformer 68 and allows this potential to appear across the deflection plates 74 and 76 through a secondary winding 73 of the transformer. Beam positioning being here accomplished on an electrostatic basis no unidirectional current flow through the secondary winding 73 is required. The beam positioning polarity across the plates 74 and 76 may be reversed for positioning purposes as was the current in the electromagnetic embodiment shown in Figure 1 by simply adjusting the tap 67 on the resistor 66.

It is seen from the above description that the applicant has provided a novel, economical, and efficient method of remotedly imparting direct current beam positioning control voltages to cathode ray equipment over the same transmission lines employed for communication of deflection signals thereto and although particular application has been shown to cathode ray equipment it is evident the general scheme outlined above for permitting the effectual direct current bypassing of electromagnetic transformers may be advantageously applied in numerous other communication fields.

What is claimed is:

1. In an electric wave transmission system a source of electric wave energy, a unidirectional potential source, an auto-transformer having a primary winding constituting a portion of a secondary winding said primary winding in turn comprising at least two separate windings directly connected by a capacitance, utilization means for said electric waves energy, circuit connections between said auto-transformer primary, said wave source and said potential source, and circuit connections between said utilization means and said auto-transformer secondary whereby said unidirectional potential is applied to said utilization means through a portion of said secondary winding without producing a flow of unidirectional current in said primary winding.

2. In a cathode ray tube deflection circuit, a source of deflection signal, a source of unidirectional potential, an electron beam deflecting device for a cathode ray tube, said device having terminals adapted to receive deflection signal as well as a unidirectional potential for purposes of electron beam positioning, an auto-transformer having split primary and a balanced secondary, a capacitor connecting the two sections of said split primary, an electrical connection between said primary, said source of deflection signal and said source of unidirectional potential, and an electrical connection from said balanced secondary winding to said deflection device terminals whereby unidirectional potential is applied to said terminals through said secondary winding without producing a current flow in said primary winding.

3. Apparatus as set forth in claim 2 wherein said deflection device is an electromagnetic deflection yoke.

4. In a cathode ray tube deflection circuit, a source of deflection signal, a source of unidirectional potential, an electron beam deflecting mechanism for the cathode ray tube, said mechanism having terminals adapted to receive deflection signal as well as a unidirectional potential for purposes of electron beam positioning, an electromagnetic transformer having a primary winding and a secondary winding, a capacitor connecting said source of electric wave energy to said primary winding, electrical connections adapted to conduct unidirectional current for connecting said source of deflection signal, said unidirectional potential source and said deflection mechanism terminals, said last named connections including said secondary winding.

5. Apparatus as defined in claim 4 wherein said deflecting mechanism comprises two or more electrostatic deflection plates incorporated in the cathode ray tube.

6. An impedance changing device for translating unidirectional current flow from a source of unidirectional potential to a utilization means without imposing additional direct current loading on said source, said device comprising in combination, a transformer having a primary winding and a secondary winding, a capacitor connected in series with said primary winding, said series combination being connected across said potential source, and a series connection including said potential source, said utilization means and said secondary winding.

VERNON J. DUKE.

REFERENCES CITED

The following references are of record in the file of this patent:

UNITED STATES PATENTS

| Number | Name | Date |
|---|---|---|
| 2,230,819 | White | Feb. 4, 1941 |
| 2,260,546 | Tingley | Oct. 28, 1941 |
| 2,280,733 | Tolson | Apr. 21, 1942 |